(12) United States Patent
Kida

(10) Patent No.: US 10,059,333 B2
(45) Date of Patent: Aug. 28, 2018

(54) DRIVING SUPPORT DEVICE

(71) Applicant: TOYOTA JIDOSHA KABUSHIKI KAISHA, Toyota-shi (JP)

(72) Inventor: Akihiro Kida, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/478,524

(22) Filed: Sep. 5, 2014

(65) Prior Publication Data

US 2015/0073621 A1 Mar. 12, 2015

(30) Foreign Application Priority Data

Sep. 11, 2013 (JP) ................................. 2013-188765

(51) Int. Cl.
  *B60W 30/08* (2012.01)
  *B60W 10/06* (2006.01)
  *B60W 10/18* (2012.01)

(52) U.S. Cl.
  CPC ............ *B60W 30/08* (2013.01); *B60W 10/06* (2013.01); *B60W 10/18* (2013.01); *B60W 2520/10* (2013.01); *B60W 2550/12* (2013.01)

(58) Field of Classification Search
  CPC ...... B60W 30/08; B60W 10/06; B60W 10/18; B60W 2550/12; B60W 2520/10
  See application file for complete search history.

(56) References Cited

U.S. PATENT DOCUMENTS

| 7,124,027 B1* | 10/2006 | Ernst, Jr. ............... | B60W 30/09 340/435 |
| 2006/0055354 A1* | 3/2006 | Hirose .................. | B60S 1/0818 318/444 |
| 2012/0314055 A1 | 12/2012 | Kataoka | |
| 2013/0079998 A1* | 3/2013 | Furness ..................... | B60S 3/00 701/49 |

FOREIGN PATENT DOCUMENTS

| JP | 7-65297 | 3/1995 |
| JP | 10-81156 | 3/1998 |
| JP | 10-226318 A | 8/1998 |
| WO | WO 2012/169029 A1 | 12/2012 |

OTHER PUBLICATIONS

Aug. 13, 2013 Wikipedia article, cruise control, printed Jan. 8, 2016.*
How Windshield Wipers Work, printed Jan. 8, 2016.*

* cited by examiner

*Primary Examiner* — Alan D Hutchinson
(74) *Attorney, Agent, or Firm* — Oblon, McClelland, Maier & Neustadt, L.L.P.

(57) ABSTRACT

A driving support device includes a sensor for acquiring object information on an object outside a vehicle; and a processing device for suppressing driving support, which is based on the object information, if an operation frequency of a wiper is equal to or higher than a predetermined reference and for providing the driving support if the operation frequency of the wiper is lower than the predetermined reference and if a vehicle speed is higher than a predetermined vehicle speed.

2 Claims, 4 Drawing Sheets

DRIVING SUPPORT DEVICE

INCORPORATION BY REFERENCE

The disclosure of Japanese Patent Application No. 2013-188765 filed on Sep. 11, 2013 including the specification, drawings and abstract is incorporated herein by reference in its entirety.

BACKGROUND OF THE INVENTION

1. Field of the Invention

The present invention relates to a driving support device.

2. Description of Related Art

A constant-speed traveling device, the speed of which is controlled based on the distance to the vehicle ahead, is known (for example, see Japanese Patent Application Publication No. 10-81156 (JP 10-81156 A)). This constant-speed traveling device stops the inter-vehicle distance control or the constant-speed traveling control when the wiper intermittent operation state is detected continuously for a predetermined time or longer and, at the same time, the interval between the wiper intermittent operations is a predetermined time or shorter.

In general, the operation frequency of the wiper required to ensure visibility may depend not only on the raining condition but also on the vehicle speed. For example, even when it rains heavily, the operation frequency of the wiper need not sometimes be higher when the vehicle travels at a low speed than when the vehicle travels at a high speed. Therefore, in some cases, the raining condition cannot be predicted accurately when only the wiper operation state is considered.

SUMMARY OF THE INVENTION

In view of the foregoing, the present invention provides a driving support device that provides driving support by accurately predicting the raining condition.

A driving support device in a first aspect of the present invention includes a sensor that acquires object information on an object outside a vehicle; and a processing device that suppresses driving support, which is based on the object information, if an operation frequency of a wiper is equal to or higher than a predetermined reference and for providing the driving support if the operation frequency of the wiper is lower than the predetermined reference and if a vehicle speed is higher than a predetermined vehicle speed.

A driving support device in a second aspect of the present invention includes a sensor that acquires object information on an object outside a vehicle; a raindrop sensor that detects a raindrop amount adhered to a windshield; and a processing device that suppresses driving support, which is based on the object information, if the raindrop amount is equal to or higher than a predetermined reference and for providing the driving support if the raindrop amount is lower than the predetermined reference and if a vehicle speed is higher than a predetermined vehicle speed.

The present invention provides a driving support device capable of providing driving support by accurately predicting the raining condition.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments are described below in detail with reference to the attached drawings.

Figure 1:
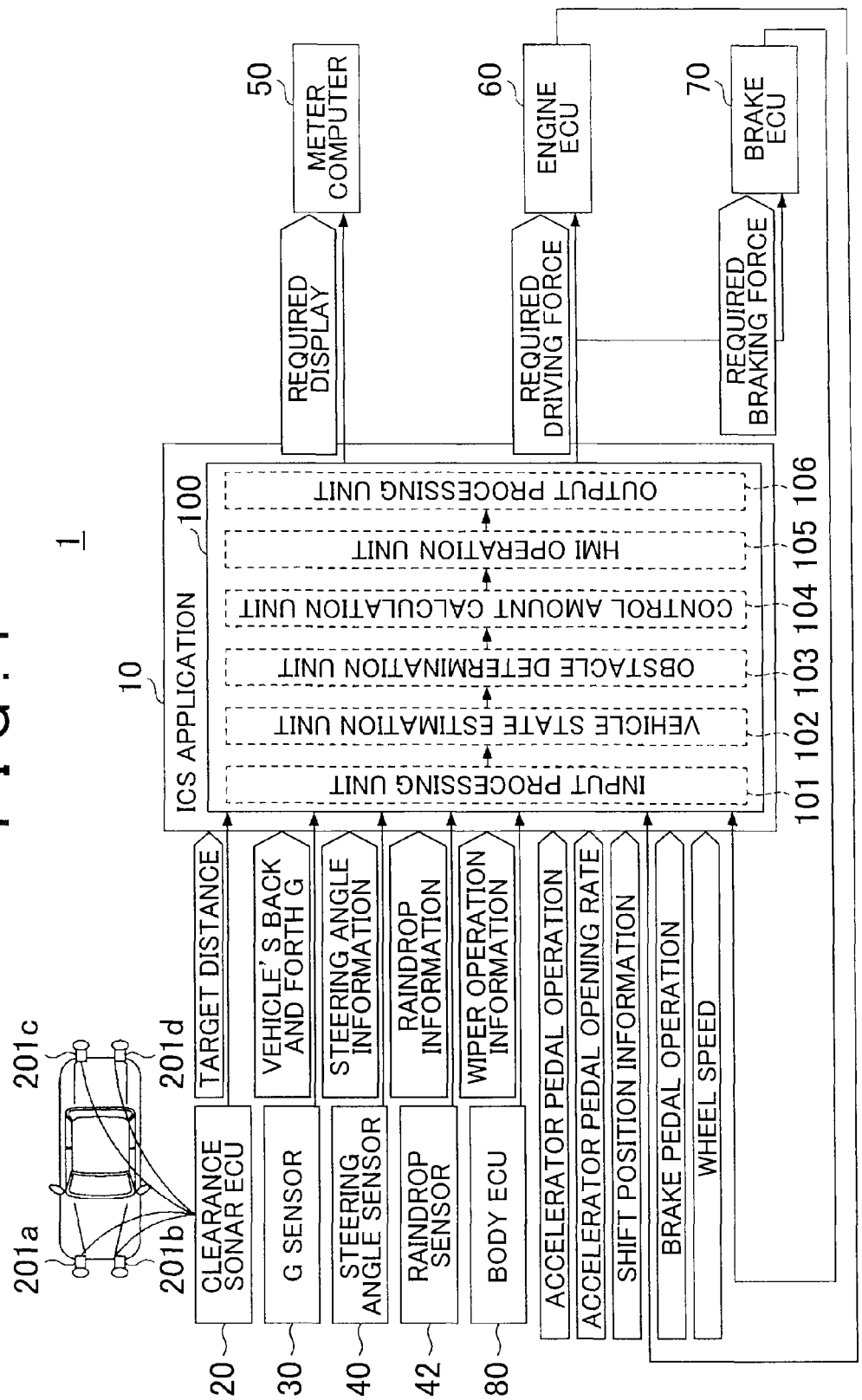
FIG. 1 is a block diagram showing an example of a system configuration that includes a vehicle travel control device in one embodiment.

FIG. 1 is a block diagram showing an example of a system configuration that includes a vehicle travel control device 1 in one embodiment.

Referring to FIG. 1, the vehicle travel control device 1 includes a driving support ECU 10. The driving support ECU 10, configured by a microcomputer, includes a ROM in which the control program is stored, a readable/writable RAM in which operation results are stored, a timer, a counter, an input interface, and an output interface.

The function of the driving support ECU 10 may be implemented by any hardware, software, or firmware or by a combination of them. For example, the function of the driving support ECU 10 may be implemented, in part or in whole, by an application-specific integrated circuit (ASIC) and a field programmable gate array (FPGA). Similarly, the function of the driving support ECU 10 may be implemented, in part or in whole, by other ECUs (such as a brake ECU 70 or a clearance sonar ECU 20). Conversely, the driving support ECU 10 may implement, in part or in whole, the function of other ECUs (such as the brake ECU 70 or the clearance sonar ECU 20).

To the driving support ECU 10, the clearance sonar ECU 20, clearance sonars 201a, 201b, 201c, and 201d, a G sensor 30, a steering angle sensor 40, a meter computer 50, an engine ECU 60, and a brake ECU 70 may be connected. For example, the driving support ECU 10 may be connected to the clearance sonar ECU 20, G sensor 30, steering angle sensor 40, meter computer 50, engine ECU 60, and brake ECU 70, either via a controller area network (CAN) or directly, so that the driving support ECU 10 can communicate with those components.

The clearance sonars 201a, 201b, 201c, and 201d, each of which is an ultrasonic sensor, are installed in the suitable positions of the body. The clearance sonars 201a, 201b, 201c, and 201d are an example of a sensor capable of detecting the presence of, or the distance to, an object in a relatively short range in which an object several centimeters to several meters away can be detected. In the example shown in the figure, the two clearance sonars 201a and 201b are provided on a front bumper, and the two clearance sonars 201c and 201d on the rear bumper. Note that the number of sensors and their arrangement are not limited to those in the example shown in the figure. For example, four clearance sonars may be provided on the front, four on the rear, and two on the side of the vehicle. Each of the clearance sonars 201a-201d outputs the detection result (object information), acquired in each detection range, to the clearance sonar ECU 20.

The clearance sonars 201a, 201b, 201c, and 201d may be those that operate in a low-speed range where the vehicle speed is higher than 0. In addition, the clearance sonars 201*a* and 201*b*, provided for detecting an object in front, may be those that operate when traveling in the forward direction with the shift lever in the driving range (for example, range D), and the clearance sonars 201*c* and 201*d*, provided for detecting an object in back, may be those that operate when traveling in the backward direction with the shift lever in the reverse range (when backing the vehicle).

The clearance sonar ECU 20 processes the detection results, received from the clearance sonars 201*a*-201*d*, and calculates the "target distance" that is the distance to an object. The clearance sonar ECU 20 sends the information on the calculated target distance (distance information) to the driving support ECU 10. For example, the clearance sonar ECU 20 may measure the distance to an object by measuring the time that elapses until the ultrasonic wave, output from a clearance sonar, is reflected by the object and the reflected wave returns to the clearance sonar. When the detection angle of the clearance sonar is wide (for example 90°), the direction of an object cannot be identified only by the detection result received from one clearance sonar. The clearance sonar ECU 20 may identify the position (direction) of an object, or may determine the shape of an object (whether the object has a shape of a wall or a telephone pole), by obtaining the distances from a plurality of clearance sonars to the object.

The G sensor 30 measures the back and forth acceleration of a vehicle and sends the measurement result to the driving support ECU 10 as the information on the "back and forth G value of the vehicle". The back and forth acceleration of a vehicle, measured by the G sensor 30, is the sum of the acceleration calculated from the wheel speed and the gravitational acceleration driven by the slope of the road (inclination of the vehicle). This means that the slope of a road can be measured by subtracting the acceleration, calculated from the wheel speed, from the back and forth G value of the vehicle measured by the G sensor 30.

The steering angle sensor 40 detects the steering angle of the steering wheel and sends the detected steering angle to the driving support ECU 10 as the steering angle information.

To the meter computer 50, a combination meter device (not shown) and an information sound generation device (not shown) are connected. The combination meter device sends information to the driver via a display, while the information sound generation device sends information to the driver via voice. In response to a request from the driving support ECU 10, the meter computer 50 controls numeric values, characters, graphics, and indicator lamps displayed on the combination meter device and, at the same time, controls warning sounds or warning voices informed by the information sound generation device.

The engine ECU 60 controls the operation of the engine that is the driving source of the vehicle. For example, the engine ECU 60 controls the ignition timing and the fuel injection amount. The engine ECU 60 controls the engine output based on the driving force required by the driving support ECU 10 that will be described later. For a hybrid vehicle, the engine ECU 60 may work with the hybrid ECU, which controls the hybrid system, to control (reduce) the driving force according to the driving force required by the driving support ECU 10. For a hybrid vehicle or an electric vehicle, the motor output may be controlled based on the driving force required by the driving support ECU 10.

The engine ECU 60 may send the information on the accelerator pedal operation, the information on the accelerator pedal opening rate, and the shift position information to the driving support ECU 10. The information on the accelerator pedal operation is the information indicating the operation amount of the accelerator pedal not shown. The information on the accelerator pedal opening rate is the information indicating the accelerator opening rate. The shift position information is the information indicating the position of the shift lever such as P (parking), R (reverse), N (neutral), and D (drive). The information on the accelerator pedal operation may be acquired directly from the accelerator position sensor. The shift position information may be acquired from the ECU that controls the transmission or directly from the shift position sensor.

The brake ECU 70 controls the brake device of the vehicle. For example, the brake ECU 70 controls the brake actuator that actuates the hydraulic brake device arranged in the wheels not shown. The brake ECU 70 controls the output (wheel cylinder pressure) of the brake actuator based on the braking force required by the driving support ECU 10 that will be described later. The brake actuator may include a pump (and a motor that drives the pump) and various valves for generating high-pressure oil. The hydraulic circuit of the brake device may have any configuration. The hydraulic circuit of the brake device may have a configuration in which the wheel cylinder pressure can be increased regardless of the driver's brake pedal depression amount. Typically, the hydraulic circuit is only required to have a high-pressure hydraulic source (pump and accumulator for generating high-pressure oil) other than the master cylinder. In addition, the hydraulic circuit may have a circuit configuration typically used in a brake-by-wire system such as an electric control braking system (ECB). For a hybrid vehicle or an electric vehicle, the motor output (regeneration operation) may be controlled based on the braking force required by the driving support ECU 10.

The brake ECU 70 may send the brake pedal operation information and the wheel speed information to the driving support ECU 10. The wheel speed information may be the information generated based on the signal received from the wheel speed sensor provided in each wheel not shown. The vehicle speed (vehicle body speed) and the acceleration/deceleration can be calculated from the wheel speed information. The brake pedal operation information may be acquired directly from the brake-pedal force switch or the master cylinder pressure sensor. Similarly, the wheel speed information (or the vehicle speed information) may be acquired directly from the wheel speed sensor or the driving shaft rotation sensor.

The driving support ECU 10 includes an intelligent clearance sonar (ICS) application 100. In the example shown in the figure, the ICS application 100, software operating in the driving support ECU 10, includes an input processing unit 101, a vehicle state estimation unit 102, an obstacle determination unit 103, a control amount calculation unit 104, a human machine interface (HMI) operation unit 105, and an output processing unit 106.

The driving support ECU 10 provides driving support based on the information received from the clearance sonar ECU 20 so that the vehicle does not collide with an object identified as an obstacle. The driving support ECU 10 provides driving support, for example, by outputting a warning to prompt the driver to manually apply the brake (through cooperation with the meter computer 50), by providing intervention to reduce the driving force (through cooperation with the engine ECU 60), or by providing intervention to generate the braking force (through cooperation with the brake ECU 70).

The input processing unit 101 performs input processing for various types of information the driving support ECU 10 receives. For example, the input processing unit 101 converts the information, received via the CAN communication standard, to the information usable by the ICS application 100. The input processing unit 101 receives the distance information from the clearance sonar ECU 20, the vehicle back and forth G value information from the G sensor 30, the steering angle information from the steering angle sensor 40, and the raindrop information from a raindrop sensor (rain sensor) 42. In addition, the input processing unit 101 receives the accelerator pedal operation information, the accelerator pedal opening rate information, and the shift position information from the engine ECU 60, receives the brake pedal operation information and the wheel speed information from the brake ECU 70, and receives the wiper operation information on the windshield wiper (hereinafter called simply a "wiper") from a body ECU 80. The wiper operation information may be the information (setting information) indicating the state of a wiper switch 301 (see FIG. 2) or the information (control information) indicating the control state of the wiper. The input processing unit 101 may also receive the raindrop information via the body ECU 80.

The vehicle state estimation unit 102 has the function to estimate the vehicle state based on various types of information described above that the input processing unit 101 has received. For example, the vehicle state estimation unit 102 may determine whether the vehicle is now in the vehicle state in which the clearance sonars 201a-201d should operate. The processing performed by the vehicle state estimation unit 102 will be described later.

The obstacle determination unit 103 determines whether an object, detected by the clearance sonars 201a-201d, is an obstacle to be detected (obstacle determination) based on the target distance received from the clearance sonar ECU 20. The obstacle determination processing is necessary because the information on the objects, detected by the clearance sonars 201a-201d, sometimes includes noises or the information on an object that is not actually an obstacle (for example, snow accumulated on the clearance sonars 201a-201d). Therefore, there is a need to determine whether the information on the objects, detected by the clearance sonars 201a-201d, is the object information on an obstacle to be detected. Obstacle determination may be made in any mode. For example, if an object is detected by the clearance sonars 201a-201d continuously for a predetermined time, that object may be determined as an obstacle to be detected. Obstacle determination may be made independently for object information detected by each of the clearance sonars 201a-201d.

For an object that is determined (decided) as an obstacle to be detected, the obstacle determination unit 103 determines whether the object will collide with the vehicle, based on the object information associated with the object detected by the clearance sonars 201a-201d. More specifically, the obstacle determination unit 103 determines whether the detected object is likely to collide with the vehicle (whether driving support should be provided to avoid collision with the object). For example, based on the information including the object information on the object detected by the clearance sonars 201a-201d, the steering angle information received from the steering angle sensor 40, and the wheel speed information received from the brake ECU 70, the obstacle determination unit 103 may determine that the vehicle will collide with the object if the distance to the object is shorter than a predetermined distance, if the vehicle speed is equal to or higher than a predetermined value (or if the amount of required deceleration is equal to or higher than a predetermined threshold), and if the object is positioned in a range in which collision is unavoidable by the steering operation.

The control amount calculation unit 104 calculates the control amount of driving support. For example, when an object determined (decided) as an obstacle to be detected is positioned within a predetermined distance, the control amount calculation unit 104 calculates the driving force for a reduced driving power. In addition, when the obstacle determination unit 103 determines that the vehicle will collide with an object, the control amount calculation unit 104 calculates the required deceleration (target deceleration) for avoiding collision with the object and calculates the required braking force according to the target deceleration.

The HMI operation unit 105 is an operation unit that outputs various types of information for alerting the driver to an obstacle when an obstacle to be detected is detected. The HMI operation unit 105 performs operations to output a notification to the driver via the meter computer 50 using a display device, an audio device, or a vibration device not shown.

The output processing unit 106 converts the control amount (required driving force or required braking force), calculated by the control amount calculation unit 104, and the operation result (output information), produced by the HMI operation unit 105, to the signal conforming to the CAN communication standard. After that, the output processing unit 106 outputs the converted signal to the engine ECU 60, brake ECU 70, and meter computer 50.

Figure 2:
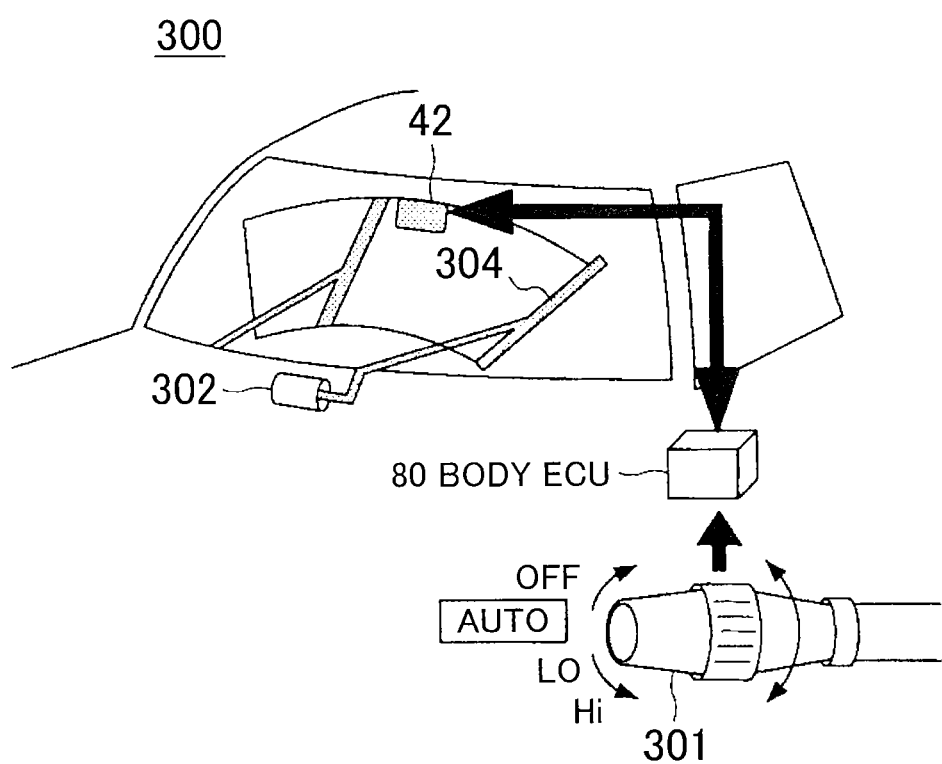
FIG. 2 is a diagram showing an example of an auto wiper system.

FIG. 2 is a diagram showing an example of an auto wiper system 300.

The wiper switch 301 is arranged in the steering column. The wiper switch 301 can be switched among Auto, On (INT, Lo, Hi), and Off. The body ECU 80 operates in the auto mode when the wiper switch 301 is placed in the Auto position. In the auto mode, the raindrop sensor 42 starts detecting the raindrop amount, and the electric signal, corresponding to the raindrop amount detected by the raindrop sensor 42, is supplied to the body ECU 80. The raindrop sensor 42 may also be installed on the windshield (on the vehicle interior side). The raindrop sensor 42 may detect raindrops using any detection principle. For example, the raindrop sensor 42 may use the phenomenon that, when there is a raindrop on the surface of the windshield, a part of an infrared ray is not reflected by, but is transmitted through, the windshield.

In the auto mode, the body ECU 80 determines the operation frequency of a wiper 304 according to the two factors, one is the raindrop amount detected by the raindrop sensor 42 and the other is the vehicle speed and, based on the determined operation frequency, controls a wiper motor 302. For example, the body ECU 80 may control the wiper motor 302 in such a way that the larger the raindrop amount is, the higher the operation frequency of the wiper 304 is (shorter interval between intermittent operations). In addition, the body ECU 80 may set the operation frequency of the wiper 304 to a lower operation frequency when the vehicle speed is lower than a predetermined vehicle speed V1 than when the vehicle speed is higher than the predetermined vehicle speed V1. For example, if the vehicle speed is higher than the predetermined vehicle speed V1, the body ECU 80 may control the wiper motor 302 in such a way that the larger the raindrop amount is, the higher the operation frequency of the wiper 304 is; conversely, if the vehicle speed is lower than the predetermined vehicle speed V1, the body ECU 80 may control the wiper motor 302 in such a way that the operation frequency of the wiper 304 becomes a predetermined low frequency (for example, Lo or intermittent operation).

In one example, the body ECU 80 controls the wiper operation frequency as follows in the auto mode. If the vehicle speed is equal to or higher than the predetermined vehicle speed V1 and if the raindrop amount is equal to or larger than a predetermined threshold Th1, the body ECU 80 sets the operation frequency of the wiper 304 to 'Hi'. On the other hand, if the vehicle speed is lower than the predetermined vehicle speed V1, the body ECU 80 sets the operation frequency of the wiper 304 to a frequency lower than 'Hi' (for example, 'Lo' or intermittent operation) even if the raindrop amount is equal to or larger than the predetermined threshold Th1. The predetermined vehicle speed V1 used in the above example may be the vehicle speed (0) corresponding to the stopped state or may correspond to the upper limit value of the vehicle speed range in which the vehicle moves at an extremely low speed (for example, immediately after the start).

Figure 3:
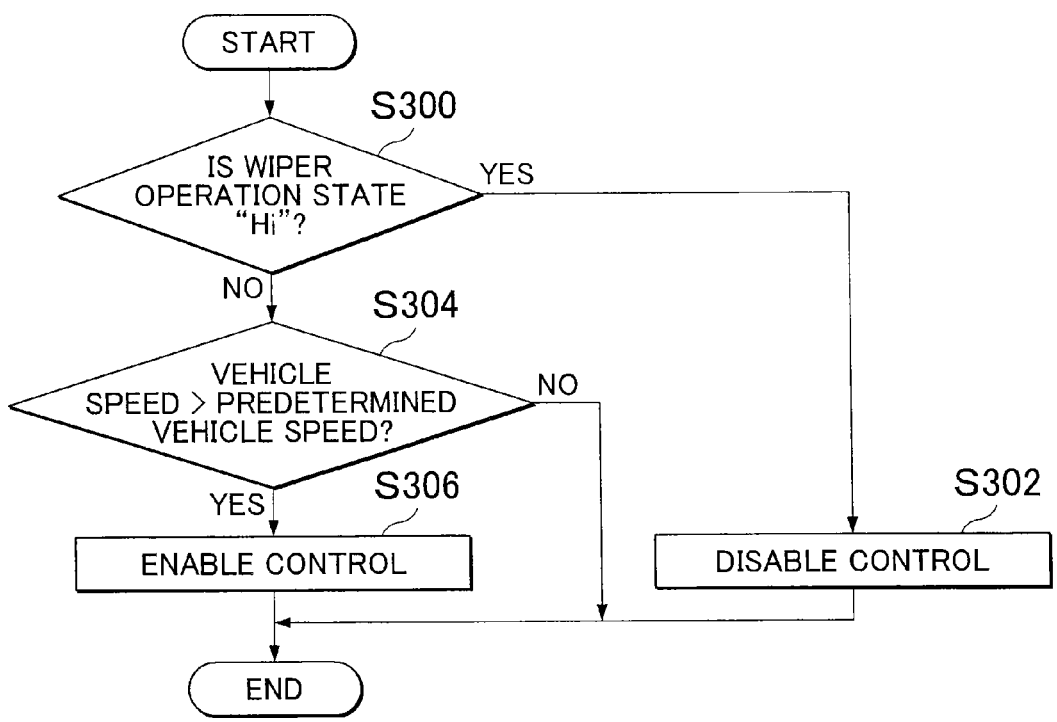
FIG. 3 is a flowchart showing an example of processing executed by a vehicle state estimation unit.

FIG. 3 is a flowchart showing an example of processing executed by the vehicle state estimation unit 102. The processing routine shown in FIG. 3 may be executed at a predetermined periodic interval while the wiper switch 301 is placed in the Auto position.

In step 300, the vehicle state estimation unit 102 determines whether the current operation state of the wiper 304 is "Hi" based on the wiper operation information received from the body ECU 80. Because the wiper switch 301 is placed in the Auto position during execution of this processing routine, the vehicle state estimation unit 102 determines whether the current control state is "Hi". If the current operation state of the wiper 304 is "Hi", the processing proceeds to step 302; otherwise, the processing proceeds to step 304.

In step 302, the control of the driving support is disabled. When the control of the driving support is disabled, the functions of the obstacle determination unit 103, control amount calculation unit 104, HMI operation unit 105, and output processing unit 106 are substantially stopped. This is because, when the operation state of the wiper 304 is "Hi", it is predicted that the rainfall amount is large (heavy rain). In such a case, raindrops tend to adhere to the clearance sonars such as the clearance sonar 201a, with a possible result that the reliability of the object information is reduced.

In step 304, the vehicle state estimation unit 102 determines whether the vehicle speed is higher than a predetermined vehicle speed V2. Preferably, the predetermined vehicle speed V2 is equal to the predetermined vehicle speed V1 used in the auto wiper system 300. Note that the predetermined vehicle speed V2 may be a value different from the predetermined vehicle speed V1 used in the auto wiper system 300. If the vehicle speed is higher than the predetermined vehicle speed V2, the processing proceeds to step 306. On the other hand, if the vehicle speed is lower than the predetermined vehicle speed V2, the processing of the current cycle is terminated without performing any processing. In this case, the control state of the driving support remains unchanged. This means that, if the control of the driving support is in the disabled state at the start of the current cycle, the disabled state is maintained. This is because, even if the operation frequency of the wiper 304 is low, the possibility of heavy rain cannot be denied if the vehicle speed is low.

In step 306, the control of the driving support is enabled. Therefore, if the control of the driving support is in the disabled state at the start of the current cycle, the disabled state is released. On the other hand, if the control of the driving support is in the operating state (not in the disabled state) at the start of the current cycle, the operating state is maintained. This is because, if the operation frequency of the wiper 304 is low and if the vehicle speed is high, the possibility of heavy rain can be denied.

According to the example shown in FIG. 3, it is possible to simply and accurately detect the rainfall state (whether it is raining heavily), in which the control of the driving support should be disabled, by considering the relation between the current operation frequency of the wiper 304 and the vehicle speed. In a comparative configuration in which only the operation frequency of the wiper 304 is considered, there is a possibility that the control of the driving support is enabled even if it is raining heavily. This is because the operation frequency of the wiper 304 is low when the vehicle travels at a low speed (for example, when the vehicle is stationary). In contrast, according to the example shown in FIG. 3, not only the operation frequency of the wiper 304 but also the vehicle speed is considered to prevent such an inconvenience.

The processing shown in FIG. 3, though executed preferably with the wiper switch 301 in the Auto position, may also be executed with the wiper switch 301 in the On position (not in the Auto position). In this case, the vehicle state estimation unit 102 determines, in step 300, whether the wiper switch 301 is in the Hi position. This configuration reduces the possibility of the inconvenience, similar to that in the comparative configuration described above, though it depends on the choice or tendency of the driver's wiper operation. When this configuration is used, there is no need for the auto wiper system 300 (that is, no need for the auto mode).

Although the control state of the driving support is not changed if step 304 is negative (step 304: No) in the processing shown in FIG. 3, the driving support may also be suppressed at a suppression level lower than that of disabling. For example, if step 304 is negative (step 304: No) when the control of the driving support is in the operating state, the possibility of heavy rain cannot be denied. Therefore, the control of the driving support may be suppressed at a suppression level lower than that of disabling. For example, the suppression at a suppression level lower than that of disabling may be implemented by increasing the determination threshold for the execution of the driving support or by correcting the target deceleration at execution time to a lower value.

The driving support, though disabled in step 302 in the processing shown in FIG. 3, may be suppressed at a suppression level lower than that of disabling. Similarly, the suppression at a suppression level lower than that of disabling may be implemented by increasing the determination threshold for the execution of the driving support or by correcting the target deceleration at execution time to a lower value. Note that "disabling" is one mode of "suppression".

Figure 4:
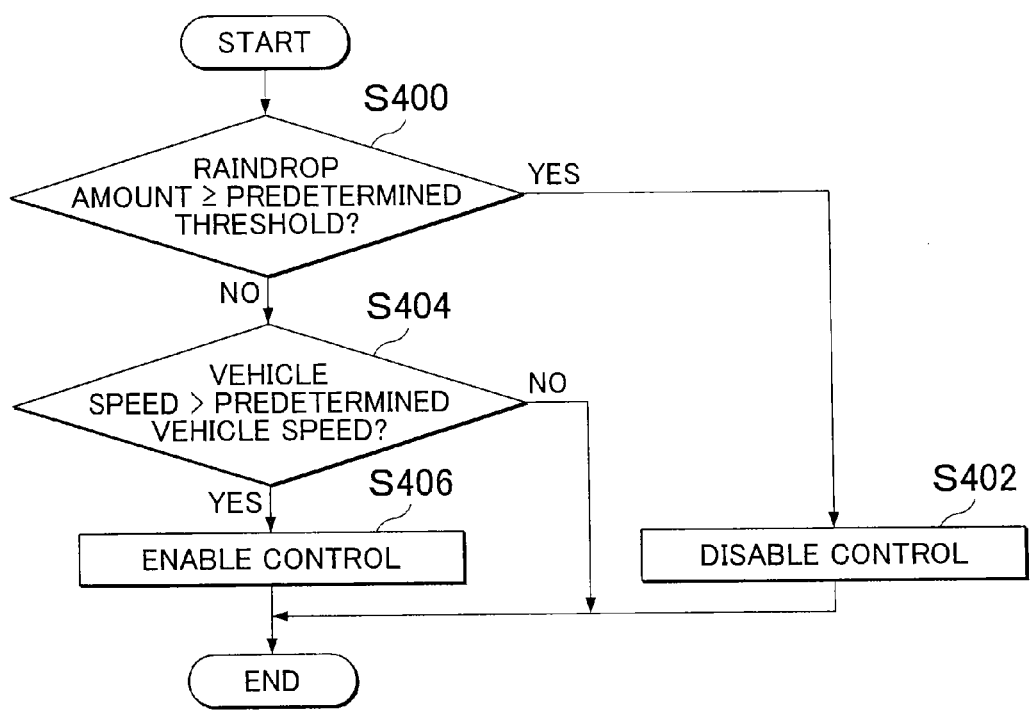
FIG. 4 is flowchart showing another example of processing executed by the vehicle state estimation unit.

FIG. 4 is flowchart showing another example of processing executed by the vehicle state estimation unit 102. The processing routine shown in FIG. 4 may be executed at a predetermined periodic interval while the wiper switch 301 is placed in the Auto position.

In step 400, the vehicle state estimation unit 102 determines whether the raindrop amount is equal to or larger than a predetermined threshold Th2, based on the raindrop information received from the raindrop sensor 42. Preferably, the predetermined threshold Th2 is equal to the above-described predetermined threshold Th1 used in the auto wiper system 300. Note that the predetermined threshold Th2 may also be a value different from the predetermined threshold Th1 used in the auto wiper system 300. If the raindrop amount is equal to or larger than the predetermined threshold Th2, the processing proceeds to step 402; otherwise, the processing proceeds to step 404.

In step 402, the control of the driving support is disabled. When the control of the driving support is disabled, the functions of the obstacle determination unit 103, control amount calculation unit 104, HMI operation unit 105, and output processing unit 106 are substantially stopped. This is because, when the raindrop amount is equal to or larger than the predetermined threshold Th2, it is predicted that the rainfall amount is large (heavy rain). In such a case, raindrops tend to adhere to the clearance sonars such as the clearance sonar 201a, with a possible result that the reliability of the object information is reduced.

In step 404, the vehicle state estimation unit 102 determines whether the vehicle speed is higher than a predetermined vehicle speed V2. Preferably, the predetermined vehicle speed V2 is equal to the predetermined vehicle speed V1 used in the auto wiper system 300. Note that the predetermined vehicle speed V2 may also be a value different from the predetermined vehicle speed V1 used in the auto wiper system 300. If the vehicle speed is higher than the predetermined vehicle speed V2, the processing proceeds to step 406. On the other hand, if the vehicle speed is lower than the predetermined vehicle speed V2, the processing of the current cycle is terminated without performing any processing. In this case, the control state of the driving support remains unchanged. This means that, if the control of the driving support is in the disabled state at the start of the current cycle, the disabled state is maintained. This is because, even if the raindrop amount based on the raindrop information received from the raindrop sensor 42 is small, the possibility of heavy rain cannot be denied if the vehicle speed is low.

In step 406, the control of the driving support is enabled. Therefore, if the control of the driving support is in the disabled state at the start of the current cycle, the disabled state is released. On the other hand, if the control of the driving support is in the operating state (not in the disabled state) at the start of the current cycle, the operating state is maintained. This is because, if the raindrop amount based on the raindrop information received from the raindrop sensor 42 is small and if the vehicle speed is high, the possibility of heavy rain can be denied.

According to the example shown in FIG. 4, it is possible to simply and accurately detect the rainfall state (whether it is raining heavily), in which the control of the driving support should be disabled, by considering the relation between the raindrop amount, determined based on the raindrop information received from the raindrop sensor 42, and the vehicle speed. In a comparative configuration in which only the raindrop amount based on the raindrop information received from the raindrop sensor 42 is considered, there is a possibility that the control of the driving support is enabled even if it is raining heavily. This is because the raindrop amount based on the raindrop information received from the raindrop sensor 42 is relatively small when the vehicle travels at a low speed (for example, when the vehicle is stationary). In contrast, according to the example shown in FIG. 4, not only the raindrop amount based on the raindrop information received from the raindrop sensor 42 but also the vehicle speed is considered to prevent such an inconvenience.

The processing shown in FIG. 4, though executed preferably with the wiper switch 301 in the Auto position, may also be executed with the wiper switch 301 in the On position (not in the Auto position).

Although the control state of the driving support is not changed if step 404 is negative (step 404: No) in the processing shown in FIG. 4, the driving support may also be suppressed at a suppression level lower than that of disabling. For example, if step 404 is negative (step 404: No) when the control of the driving support is in the operating state, the possibility of heavy rain cannot be denied. Therefore, the control of the driving support may be suppressed at a suppression level lower than that of disabling. For example, the suppression at a suppression level lower than that of disabling may be implemented by increasing the determination threshold for the execution of the driving support or by correcting the target deceleration at execution time to a lower value.

The driving support, though disabled in step 402 in the processing shown in FIG. 4, may be suppressed at a suppression level lower than that of disabling. Similarly, the suppression at a suppression level lower than that of disabling may be implemented by increasing the determination threshold for the execution of the driving support or by correcting the target deceleration at execution time to a lower value.

The processing shown in FIG. 4 may be combined with the processing shown in FIG. 3. That is, the control state of the driving support may be determined variably by considering the relation among the raindrop amount based on the raindrop information received from the raindrop sensor 42, the operation frequency of the wiper 304, and the vehicle speed. For example, in step 400, the vehicle state estimation unit 102 may determine whether the raindrop amount is equal to or larger than the predetermined threshold Th2 and whether the operation state of the wiper 304 is "Hi".

While the embodiments of the present invention have been described above in detail, it is to be understood that the present invention is not limited to the specific embodiments and that various modifications and changes may be made within the scope of claims. It is also possible to combine all or some of the components used in the embodiments described above.

For example, though the operation frequency of the front wiper is considered in the embodiments described above, the operation frequency of the rear wiper may also be considered in place of, or in addition to, the operation frequency of the front wiper.

Although ultrasonic sensors are used in the embodiments described above, the present invention is applicable also to a configuration in which other sensors capable of detecting an obstacle are used (such as millimeter-wave sensors, laser sensors, or image sensors). For example, when an image sensor is used, the present invention is applicable because raindrops tend to adhere to the lens of a camera (or to the windshield of a cabin camera) with a possible result that the reliability of the object information is reduced.

The processing shown in FIG. 3 and FIG. 4, executed by the vehicle state estimation unit 102 in the embodiments described above, may be executed also by the obstacle determination unit 103. In this case, the obstacle determination unit 103 determines whether a detected object is an obstacle to be detected (obstacle determination) by considering the relation between the operation frequency of the wiper 304 and the vehicle speed. In this case, a substantially equivalent configuration is used.

What is claimed is:

1. A driving support device comprising:
a sensor configured to acquire object information on an object outside a vehicle; and
a processing device configured to:
suppress driving support in a case where an operation frequency of a wiper is equal to or higher than a predetermined reference;
provide the driving support in a case where the operation frequency of the wiper is lower than the predetermined reference and a vehicle speed is higher than a predetermined vehicle speed; and
after having suppressed the driving support in the case where the operation frequency of the wiper is equal to or higher than the predetermined reference:
  maintain the suppression of the driving support in a case where the operation frequency of the wiper is lower than the predetermined reference and the vehicle speed is equal to or lower than the predetermined vehicle speed, and
  enable the driving support in a case where the operation frequency of the wiper is lower than the predetermined reference and the vehicle speed is higher than the predetermined vehicle speed, wherein
processing of the processing device is executed in an auto mode in which the operation frequency of the wiper is automatically determined according to a detection value of a raindrop sensor and the vehicle speed, and
the operation frequency of the wiper in the auto mode is set to have a frequency that is lower than the predetermined reference but greater than zero when the vehicle speed is lower than the predetermined vehicle speed and is set according to the detection value of the raindrop sensor when the vehicle speed is higher than the predetermined vehicle speed.

2. The driving support device of claim 1, wherein the driving support includes providing support to avoid collision with the object.

* * * * *